United States Patent [19]
Hattori et al.

[11] Patent Number: 5,371,596
[45] Date of Patent: Dec. 6, 1994

[54] OPTICAL APPARATUS COMPONENTS HAVING SPECTRALLY OVERLAPPING CHARACTERISTICS FOR MEASURING SEMICONDUCTOR LAYER THICKNESS

[75] Inventors: Ryo Hattori, Itami; Seizi Nishizawa, Hachioji; Tokuji Takahashi, Hachioji; Ryoichi Fukasawa, Hachioji, all of Japan

[73] Assignees: JASCO Corporation; Mitsubishi Denki Kabushiki Kaisha, both of Tokyo, Japan

[21] Appl. No.: 27,639

[22] Filed: Mar. 8, 1993

[30] Foreign Application Priority Data

Apr. 28, 1992 [JP] Japan .................. 4-109798

[51] Int. Cl.$^5$ .................................. G01B 9/02
[52] U.S. Cl. ................................. 356/355; 356/359
[58] Field of Search .............. 356/345, 355, 357, 358, 356/359, 360

[56] References Cited

U.S. PATENT DOCUMENTS

| | | | |
|---|---|---|---|
| 5,002,394 | 3/1991 | Auta .................................. | 356/346 |
| 5,159,408 | 10/1992 | Waldenmaier et al. ............ | 356/357 |
| 5,202,939 | 4/1993 | Belleville et al. .................. | 356/345 |
| 5,210,590 | 5/1993 | Landa et al. ........................ | 356/319 |

FOREIGN PATENT DOCUMENTS

| | | |
|---|---|---|
| 0420113 | 4/1991 | European Pat. Off. . |
| 3110405 | 5/1991 | Japan . |

OTHER PUBLICATIONS

Abe et al. "Non–Destructive Measurement Of Surface Concentrations And Junction Depths of Diffused Semiconductor Layers", Japanese Journal of Applied Physics, vol. 7, No. 4, Apr. 1968, pp. 397–403.
Schumann, Jr., et al., "Phase Shift Corrections For Infrared Interference Measurement of Epitaxial Layer Thickness", Journal of the Electrochemical Society, vol. 113, No. 4, Apr. 1966, pp. 368–371.
Albert et al., "Thickness Measurement Of Epitaxial Films By the Infrared Interference Method", Journal of the Electrochemical Society, vol. 109, No. 8, Aug. 1962, pp. 709–713.
Schumann, Jr., "The Infrared Interference Method of Measuring Epitaxial Layer Thickness" Journal of the Electrochemical Society, vol. 116, No. 3, Mar. 1969, pp. 409–413.

*Primary Examiner*—Samuel A. Turner
*Assistant Examiner*—Robert Kim
*Attorney, Agent, or Firm*—Leydig, Voit & Mayer

[57] ABSTRACT

An apparatus for measuring the thickness of a semiconductor layer includes a light source emitting light; an interferometer producing modulated interference light by modulating the light from the light source; an optical system including a light transmission member for introducing the modulated interference light into a measurement sample including at least one film on a substrate; a light detecting element for detecting the modulated interference light reflected from the film and producing an output signal in response; an extracting element for extracting a film interference component having a waveform from the output signal; and an element for calculating the thickness of the film from the waveform of the output signal component. The light detecting element includes a plurality of photodetectors having respective photometric wavenumber ranges that overlap. Thereby, a wavenumber range that is the sum of the respective wavenumber ranges of the respective components is obtained and an optical measurement can be realized over a wide wavenumber range that could not be measured with a single photodetector.

10 Claims, 11 Drawing Sheets

PRIOR ART

OPTICAL APPARATUS COMPONENTS HAVING SPECTRALLY OVERLAPPING CHARACTERISTICS FOR MEASURING SEMICONDUCTOR LAYER THICKNESS

FIELD OF THE INVENTION

The present invention relates to an apparatus for measuring the thickness of a semiconductor layer and, more particularly, to an apparatus for non-destructively measuring the thickness of respective layers of a multiple-layer thin film structure without direct contact.

BACKGROUND OF THE INVENTIONS

A description is given of a prior art apparatus for measuring a thickness of a semiconductor layer.

Figure 12:
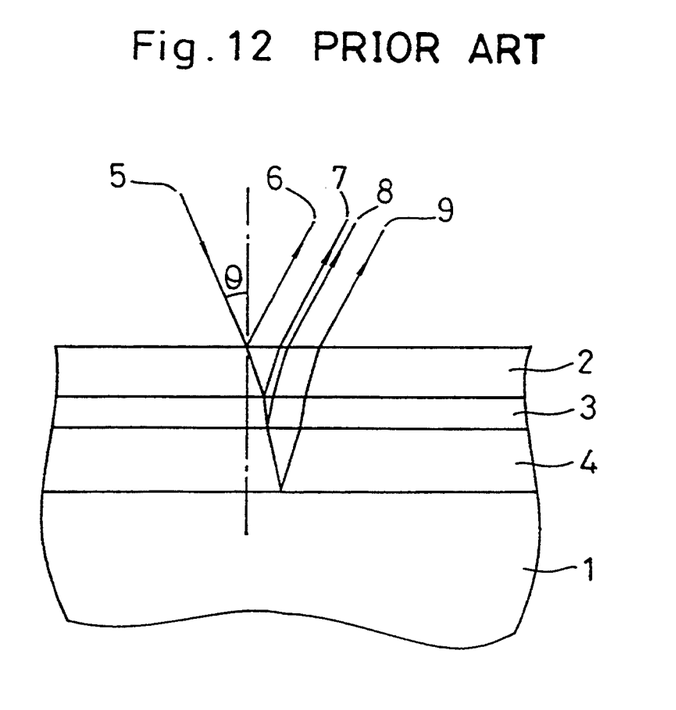
FIG. 12 is a schematic diagram showing optical paths of primary reflected light in a three-layer film formed on a substrate.

Suppose, for example, as shown in FIG. 12, a sample 11 comprising a plurality of semiconductor thin films (laminated films) 2, 3 and 4 disposed on a semiconductor substrate. A light beam 5 having a certain wavelength irradiates the surface of the sample 11 at incident angle $\theta$. Numerals 6, 7, 8 and 9 designate respectively primary reflected light components at surfaces of the thin films 2, 3 and 4 and the substrate 1. The film thicknesses and the refractive indices of the thin films 2, 3 and 4 are represented respectively as $(d_1, n_1)$, $(d_2, n_2)$ and $(d_3, n_3)$ and the refractive index of the substrate 1 is represented as $n_s$. In this case, the reflected light components 6, 7, 8 and 9 at the surface of the respective thin film layers 2, 3 and 4 and the substrate 1 have phase differences due to their optical path lengths and these composite light beams interfere with each other. Namely, the optical path difference $\delta i$ between the reflected light component 6 at the surface of the uppermost layer of the sample and the reflected light component at an interface between an i-th layer and an (i+1)-th (i=1, 2, 3) layer, both from the uppermost layer, is represented as follows:

$$\delta i = \sum_{j=1}^{i} 2 d_j \sqrt{n^2_j - n^2_o \cdot \sin^2\theta_o} \quad (1)$$

where $n_o$ is a refractive index and $\theta_o$ is an incident angle of light on the uppermost surface of a wafer. Therefore, the thicknesses of respective thin films 2, 3 and 4 can be obtained by analyzing the interference waveform of the reflected beams composed of the respective reflected light components 6 to 9 having these optical differences $\delta i$.

Figure 11:
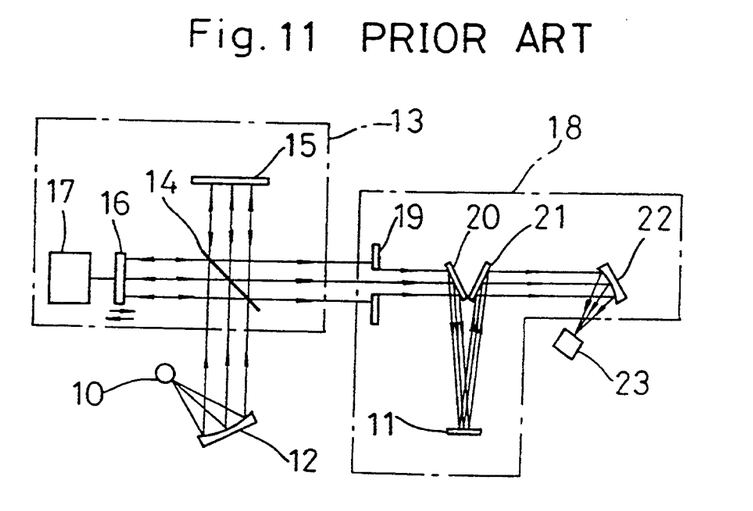
FIG. 11 is a schematic diagram showing a prior art apparatus for measuring a semiconductor layer thickness by Fourier-transformation spectroscopy.

In order to measure the thicknesses of laminated films, a method of analyzing a wavelength dispersion interference waveform of reflected interference light (hereinafter referred to as an interference spectrum) is employed. However, since the interference spectrum is complicated when the sample has a laminated structure with plural layers, a Fourier analysis method of analyzing the reflection spectrum is employed. More particularly, Fourier-transformation spectroscopy having a high utilization efficiency of light energy and therefore superior in analysis of optically measured data is employed in an apparatus for measuring the above-described reflection spectrum. FIG. 11 is a typical view showing a prior art apparatus for measuring semiconductor layer thickness employing a Fourier-transformation spectroscope, which is disclosed in Japanese Published Patent Application 3-110405.

As shown in the figure, infrared light passing through a semiconductor crystal is emitted from a light source 10, is collimated to be a parallel beam by a collimating mirror 12 and enters into a Michelson interferometer 13. The Michelson interferometer 13 includes a beam splitter 14 dividing the parallel beam into two beams of transmitted and reflected light, a fixed mirror 15 reflecting the transmitted beam from the beam splitter 14, a moving mirror 16 reflecting the reflected beam from the beam splitter 14 and a driver 17 moving mirror 16 at a constant speed in the arrow directions in FIG. 11.

The beams reflected by the fixed mirror 15 and the moving mirror 16 return to the beam splitter 14 and are synthesized as a modulated interfering light beam in which the optical path difference corresponding to the traveling distance of the moving mirror 16 varies with time. A part of the modulation interference light beam is output from the Michelson interferometer 13 and introduced into a reflection photometry system 18. The beam entering into the reflection photometry system 18 is reformed by an aperture 19 to have a predetermined area which is reflected by a plane mirror 20 to irradiate a predetermined area of the sample 11. The light irradiating to the sample 11 is subjected to the interference according to film construction of the sample 11 as described above. The light beam reflected by the sample 11 advances, changing its direction at a plane mirror 21, and is collected by a collecting mirror 22 to enter into a photodetector 23 in which the intensity of reflected interference light is detected. The intensity of the light beam detected at the photodetector 23 includes interference components according to the film construction of the sample 11 and is modulated with the traveling distance accompanying with the constant speed moving of the moving mirror 16 in the above-described Michelson interferometer 13. The interference beam intensity modulated with the distance is transformed by Fourier transformation with the traveling distance, resulting in a wavenumber dispersion spectrum of the light under measurement. This is the principle of so-called Fourier transformation optical spectrometry.

In the thus obtained reflected light spectrum, the film interference component of the sample 11 is superposed on the light intensity distribution which is dependent on the light source 10 in the apparatus and the transmission characteristics of all optical components. Therefore, by dividing the reflected light spectrum with film interference by the reflected light spectrum which is measured by providing a comparative sample such as a semiconductor substrate having no film construction in place of the sample 11, the film interference component can be separated from the reflected light spectrum. Information on the film thickness can be obtained directly from the film interference spectrum. Or, the film thickness can be analyzed from the waveform of the spatial interference intensity distribution (hereinafter referred to as Spatialgram) shown in FIG. 13, which is obtained by executing a reverse Fourier transformation of the film interference spectrum.

Figure 13:
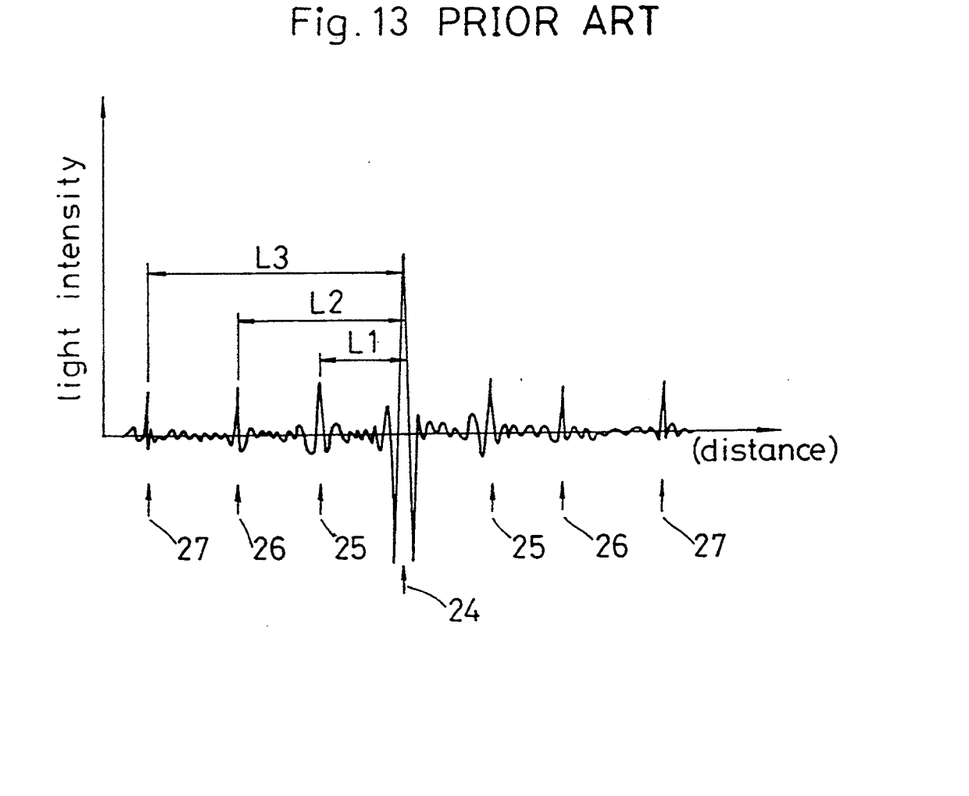
FIG. 13 is a graph showing a Spatialgram obtained by reverse Fourier transformation of the film interference spectrum which is obtained from the primary reflected light.

In the graph of FIG. 13, the abscissa represents traveling distance of the moving mirror 16 and the ordinate represents reflected light interference intensity. In the Spatialgram of FIG. 13, there appear burst peaks 24 to 26 where all beams interfere with each other and increase their strength at points where the optical path difference of the reflected light components at respective layer interfaces represented by the formula (1) coincides with an optical path difference due to the traveling position of the moving mirror 16. The distance between the respective bursts corresponds to the optical path difference of the reflected light components at the layer interfaces. In the example of FIG. 13, the burst peak 24 corresponding to the reflected light component 6 at the surface of the sample 11 (refer to FIG. 12) appears as a center burst peak and symmetrically at the left and right thereof the reflected light components 7, 8, and 9 of respective layers produce respective side burst peaks 25 to 27. Provided that the distances from the center burst peak 24 to the respective side burst peaks are Li (i=1, 2, 3), an optical path difference δi of the respective reflected light components coincide with 2Li as a sum of going path and return path to and from the moving mirror 16. Therefore, the following equation is obtained from the above-described formula (1):

$$2Li = \sum_{j=1}^{i} 2d_j \sqrt{n^2_j - n^2_o \cdot \sin^2\theta_o} \quad (2)$$

Here, since the refractive index $n_j$ and incident angle $\theta$ are known, respective layer thicknesses $d_i$ can be calculated from the distances Li between the bursts which are obtained from the Spatialgram.

Figures 14A, 14B:
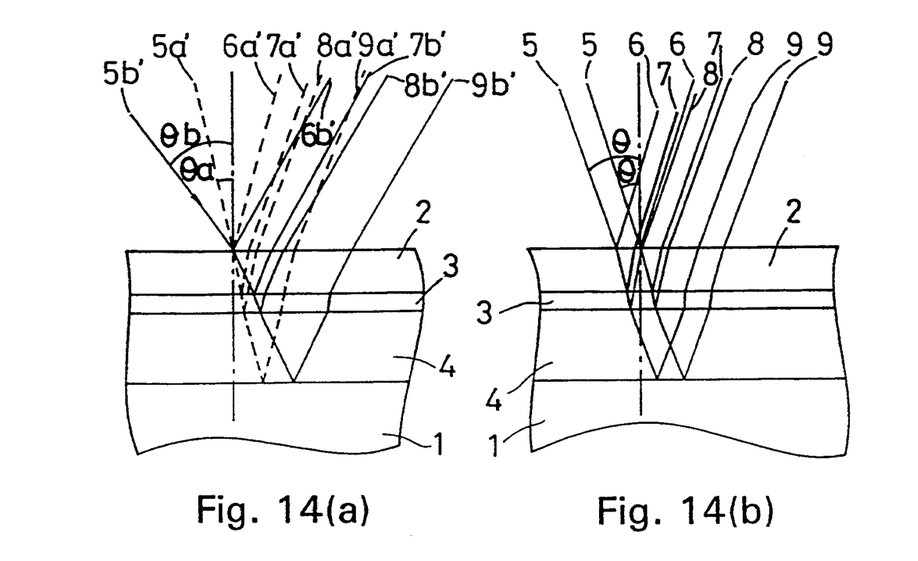
FIGS. 14(a) and 14(b) are schematic diagrams showing optical paths of a collected light beam and a parallel light beam of primary reflected light in a three-layer film on a substrate.

Next, a description is given of the operation of the apparatus for measuring a semiconductor layer thickness. Generally, a light beam collecting system shown in FIG. 14(a) is employed as a reflection photometry system. This is to enhance utilization efficiency of light energy in the reflection photometry system. As a result, the signal to noise ratio (SN ratio) of a light detected signal is enhanced, the number of times of photometry integration is reduced which shortens the photometry time. As shown in FIG. 14(a), however, since incident angle of the collected beam is actually distributed continuously with a certain incident angle as a center value and the light beams 5'a and 5'b in the collected light beam incident on the sample 11 have different incident angles θa and θb, differences also appear in the optical path lengths of the respective beams advancing in the film as shown in the figure. This results in many interference waveforms overlapping with each other in the film interference waveform accompanying the distribution of incident angle and turbulence unfavorably occurs in the film interference waveform, further resulting in a problem in analyzing thin films or multi-layer films. Then, in Japanese Published Patent Application 3-110405, by employing as a beam irradiating the sample 11 a parallel beam in a reflection photometry system, as shown in FIG. 14(b), all light rays in the beam have the same optical path lengths and no turbulence occurs in the film interference waveform. This results in quite excellent photometry performance in measuring thin films and multi-layer films.

By the way, in a method for measuring a film thickness from the analysis of the above-described film interference spectrum, the thin film measurement limit ($d_{limit}$) is mainly determined by a photometric wavenumber range ($\Delta \nu cm^{-1}$), which is represented as follows:

$$d_{limit} = \frac{1}{\Delta\nu} \cdot \frac{1}{2n} \quad (3)$$

Here, n designates a refractive index of the film. However, unless the transmitting or reflecting conditions of the light beam in all the optical elements of the spectroscope and in the measurement sample meet the photometric wavenumber range $\Delta\nu$, a spectroscope having a certain photometric wavenumber range $\Delta\nu$ cannot be obtained, resulting in difficulty in measuring a wide wavenumber range.

Figure 15:
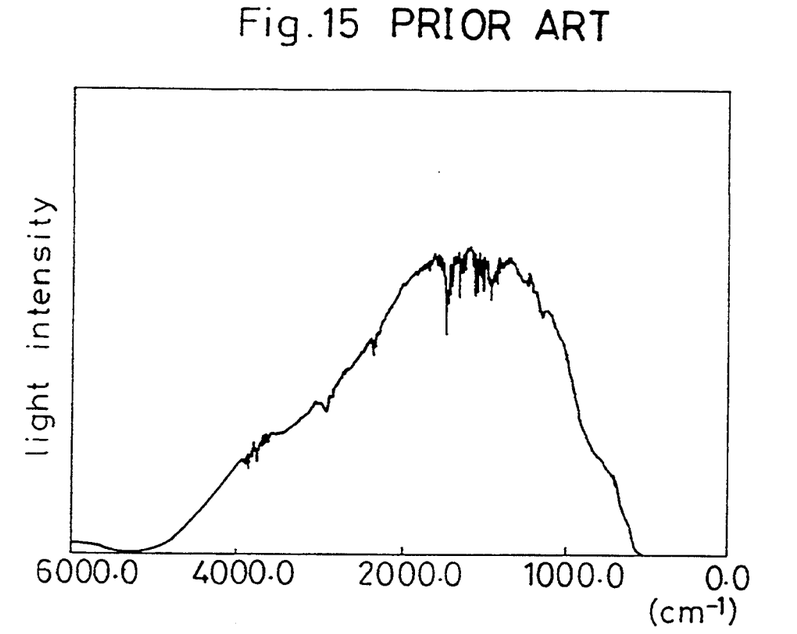
FIG. 15 is a diagram showing a sensitivity characteristic of the prior art apparatus for measuring a semiconductor layer thickness employing Fourier-transformation spectroscopy.

As an example, a description is given of application to measuring a semiconductor film thickness by a combination of optical parts employed in Fourier-transformation infrared spectroscope (hereinafter referred to as FT-IR spectroscope). In FIG. 11, a nichrome lamp is used as light source 10, potassium bromide (KBr) is used as beam splitter 14 and a photodetector employing mercury cadmium telluride (hereinafter referred to as MCT detector) is used as photodetector 23. In FIG. 12 showing a film composition of the sample 11, a semiconductor film 2 comprising an $Al_{0.45}Ga_{0.55}As$ layer having a refractive index and a thickness $(n_1, d_1)=(3.45, 0.42$ microns), a semiconductor film 3 comprising an $Al_{0.15}Ga_{0.85}As$ layer having $(n_2, d_2)=(3.56, 0.09$ microns), a semiconductor film 4 comprising an $Al_{0.45}Ga_{0.55}As$ layer having $(n_3, d_3)=(3.45, 1.55$ microns) and a semiconductor substrate 1 comprising a GaAs substrate having a refractive index $n_s$ of 3.62 are employed. FIG. 15 shows a fundamental reflection spectrum of GaAs semiconductor substrate, which is obtained by measuring a wavenumber over the whole range of a spectroscope by FT-IR spectroscope having the above-described combination. As shown in FIG. 15, the sensitivity can be obtained in a range approximately from 5000 cm$^{-1}$ to 600 cm$^{-1}$.

Figure 16:
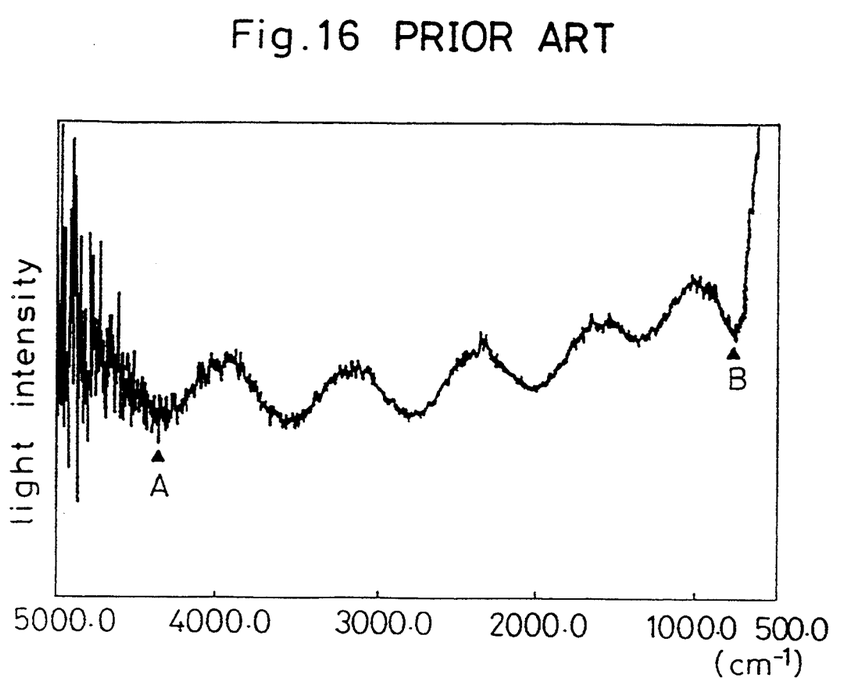
FIG. 16 is a diagram showing film interference spectrum of a three-layer film measured by a prior art apparatus for measuring a semiconductor layer thickness employing Fourier-transformation spectroscopy.
Figure 17:
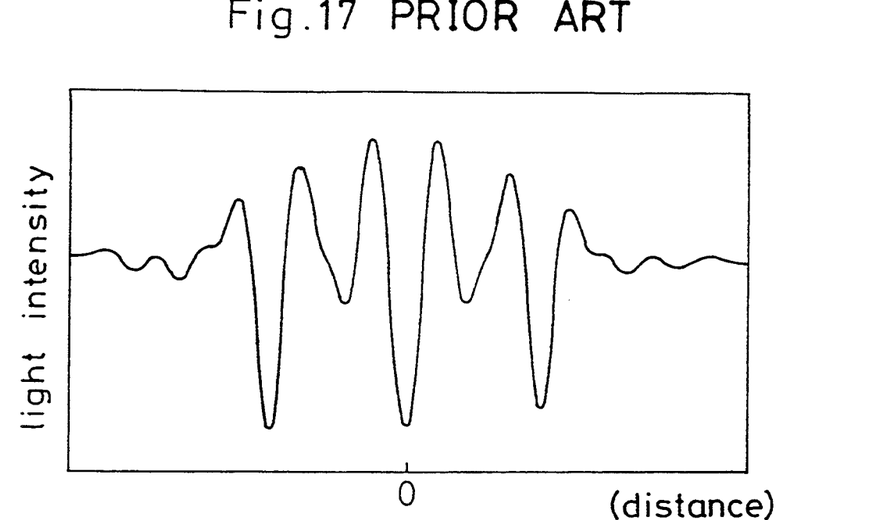
FIG. 17 is a graph showing a Spatialgram obtained by reverse Fourier transformation to the film interference spectrum.

FIG. 16 shows a reflection spectrum, which is obtained by measuring the interference spectrum of the above-described three layer semiconductor film with the FT-IR spectroscope. In the figure, there is a waveform accompanying the film interference. FIG. 17 shows a Spatialgram, which is obtained by taking out and transforming by reverse Fourier transformation, a wavenumber range from an arrow A (4300 cm$^{-1}$) to an arrow B (800 cm$^{-1}$) having photometric sensitivity in FIG. 16. Judging from FIG. 17, regardless of a waveform obtained by measuring a three-layer film, three side burst peaks do not appear and only a single side burst peak corresponding to the third layer appears.

According to the formula (3), in the photometric wavenumber range $\Delta\nu=4300-800=3500$ cm$^{-1}$, the thin film measurement limit $d_{limit}$ (3500) is 0.42 microns, which is equal to the thickness of the first layer semiconductor film 2, showing that it is difficult to distinguish the first layer from the second layer.

Figure 18:
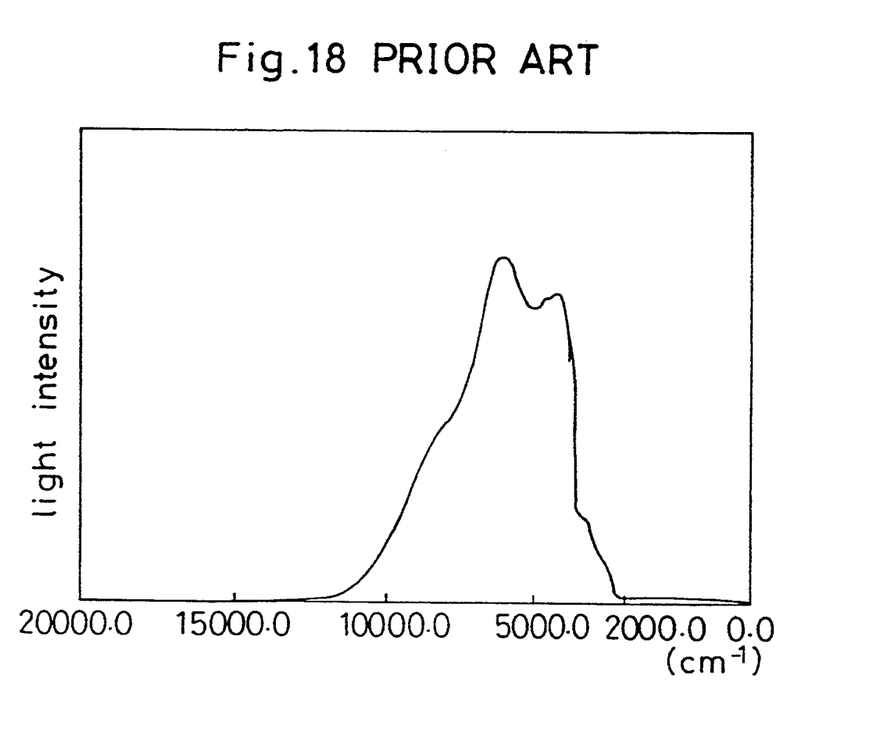
FIG. 18 is a diagram showing a sensitivity characteristic of a prior art apparatus for measuring a semiconductor layer thickness by Fourier-transformation spectroscopy employing an optimized combination of optical parts.
Figure 19:
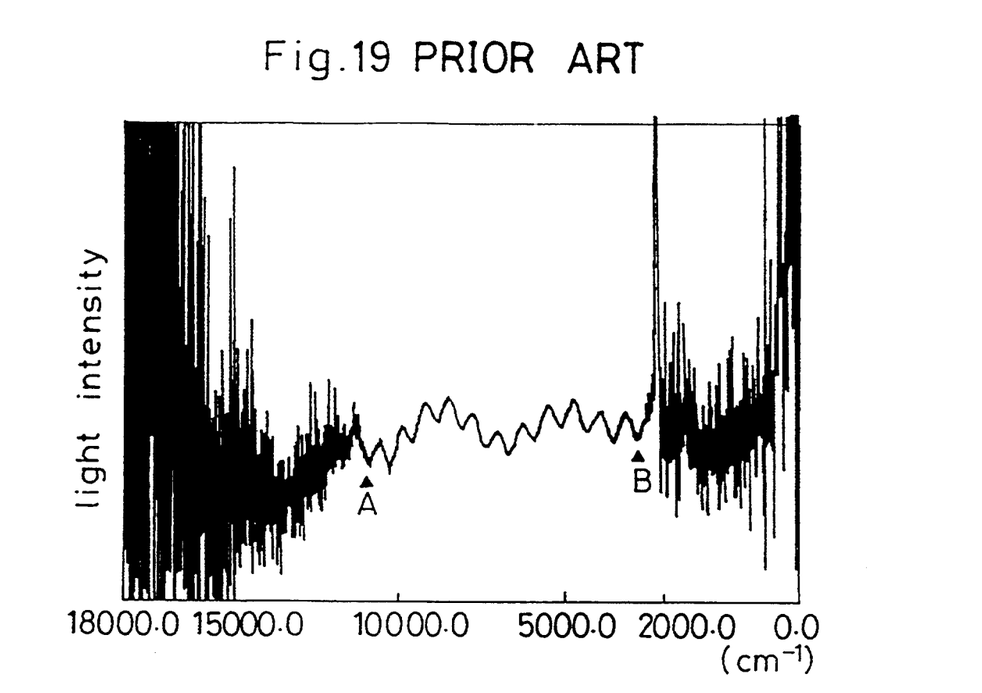
FIG. 19 is a graph showing a film interference spectrum of a three-layer film measured by the prior art apparatus for measuring a semiconductor layer thickness.
Figure 20:
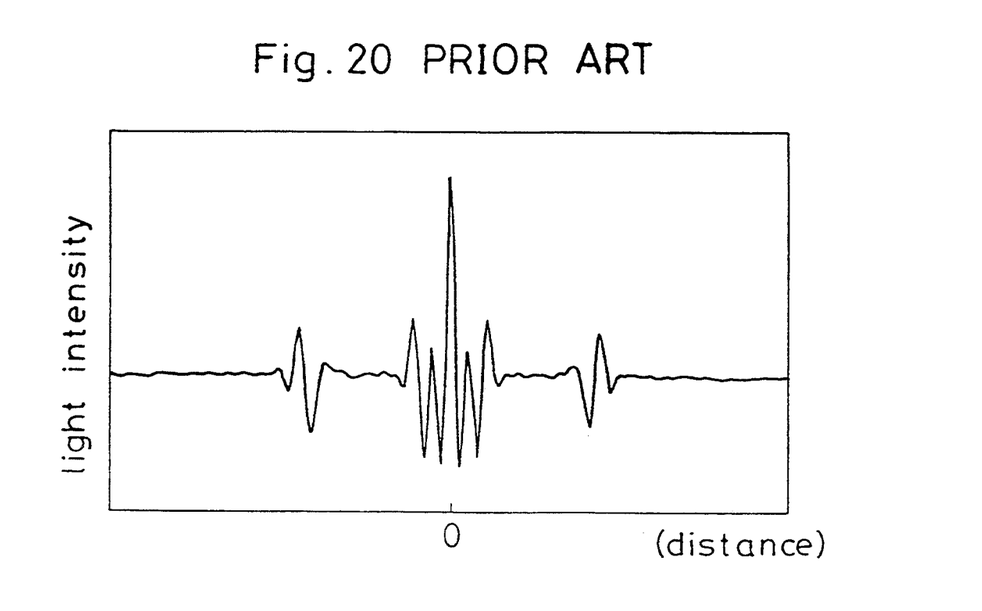
FIG. 20 is a graph showing a Spatialgram obtained by reverse Fourier transformation to the film interference spectrum.

Then, a description is given of an example which adopts the most suitable combination of optical systems capable of measuring wavenumber range in a wider. A tungsten halogen lamp is employed as light source 10, calcium fluoride is employed as beam splitter 14 and an MCT detector is employed as photodetector 23. FIG. 18 shows a fundamental reflection spectrum of a GaAs substrate employing the optical system of this combination. As shown in FIG. 18, it is admitted that there is sensitivity in a range from about 11500 cm$^{-1}$ to 2500 cm$^{-1}$. The limit at higher wavenumber side is sensitivity limit of the MCT detector and the limit at lower wavenumber side is determined by the wavelength of light from the tungsten halogen lamp. FIG. 19 shows an interference spectrum of the semiconductor film of the above-described three layer structure, which is obtained by the optical measurement employing the optical system of this combination. FIG. 20 shows a Spatialgram, which is obtained by taking out and transforming by reverse Fourier transformation, a wavenumber range from an arrow A (11000 cm$^{-1}$) to an arrow B (2800 cm$^{-1}$) having photometric sensitivity shown in FIG. 19. According to the formula (3), in the photometric wavenumber range $\Delta \nu$ of 8200 cm$^{-1}$, the thin film measurement limit $d_{limit}$ (8200) is 0.18 microns and the measurement limit (measurement sensitivity) is enhanced. However, since the second layer of the sample 11 has a thickness that is half of the measurement limit ($d_2$=0.09 microns), the first and the second side burst peaks overlap with each other and only the third side burst peak clearly appears.

The prior art apparatus for measuring a semiconductor layer thickness is constructed as described above, and there is a limit to optical measurement over a wide wavenumber range by Fourier spectroscopic photometry employing a combination of present optical materials, resulting in a problem that the thicknesses of thin semiconductor films cannot be measured.

SUMMARY OF THE INVENTION

It is an object of the present invention to provide an apparatus for measuring a semiconductor layer thickness that, overcoming an optical measurement limit due to optical parts, can optically measure over a wider wavenumber range so as to measure non-destructively and without contact a thinner semiconductor multi-layer film thickness.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to the those skilled in the art from this detailed description.

In an apparatus for measuring a semiconductor layer thickness according to the present invention, a photodetector, a light transmitting material or a light source are optically combined so that parts of respective wavenumber characteristic ranges overlap with each other.

In accordance with the present invention, the sum of respective wavenumber ranges of the respective components are obtained as a whole wavenumber range and an optical measurement can be realized over a wider wavenumber range than that of single material components.

DETAILED DESCRIPTION OF THE PREFERRED EMBODIMENT

A first embodiment of the present invention will be described in detail with reference to FIGS. 1(a) to 1(c).

Figure 1A:
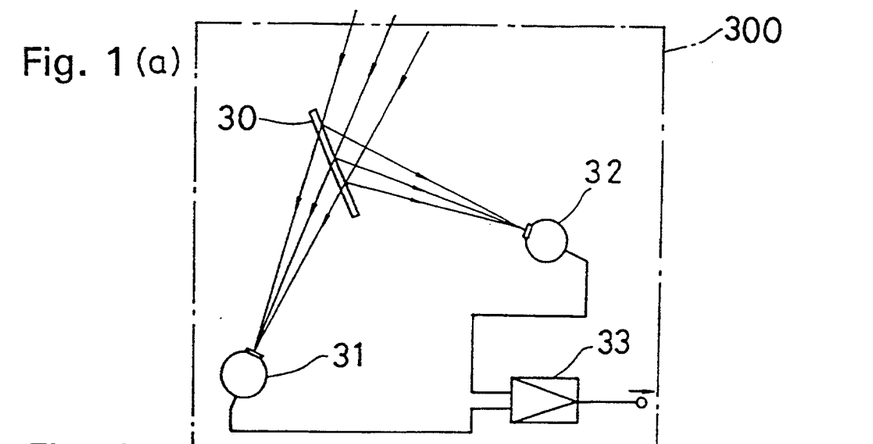
FIGS. 1(a) to 1(c) are schematic diagrams showing an apparatus for measuring a semiconductor layer thickness and a complex photodetector used therein in accordance with a first embodiment of the present invention.

In FIG. 1(a), showing a photodetector corresponding to the photodetector 23 in FIG. 11, a photodetector 300 is of a complex type in which the light beam collected by the collecting mirror 22 in FIG. 11 is divided into two beams. The beams are incident on an MCT detector 31 and a silicon (Si) detector 32 through a beam splitter 30. The respective beams are transformed into electric signals at the same time, and they are synthesized to produce a signal in an electric signal synthesizer circuit 33. The output of the synthesizer circuit is processed to result in an interference spectrum. This construction makes it possible to obtain a detection signal having wavenumber sensitivity ranges both of the MCT detector 31 and the Si detector 32. As a result, the photometric wavenumber range is enlarged to a range of the sum of the respective single detectors.

Figure 1B:
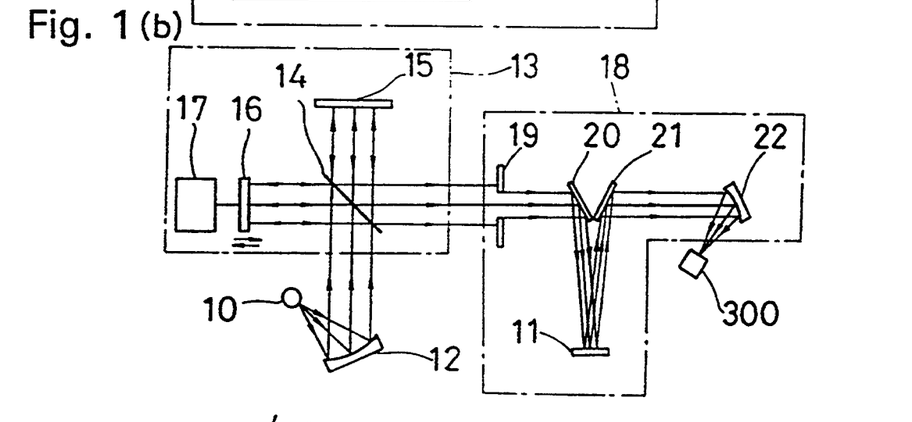
Figure 1C:
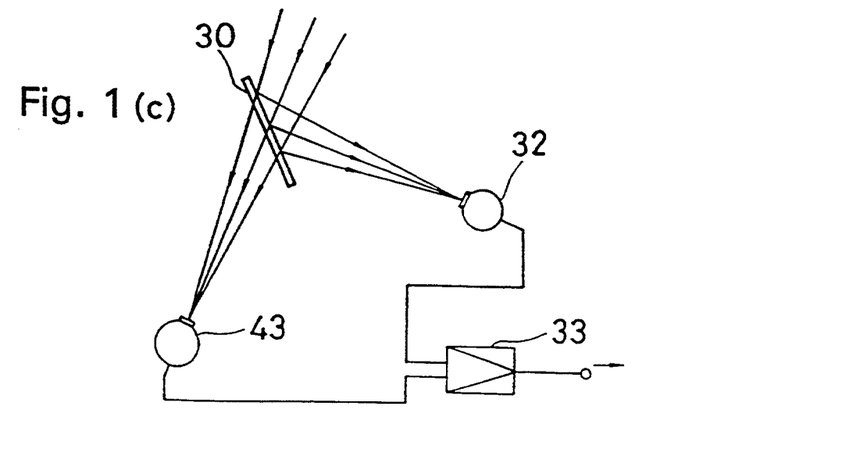
Figure 2:
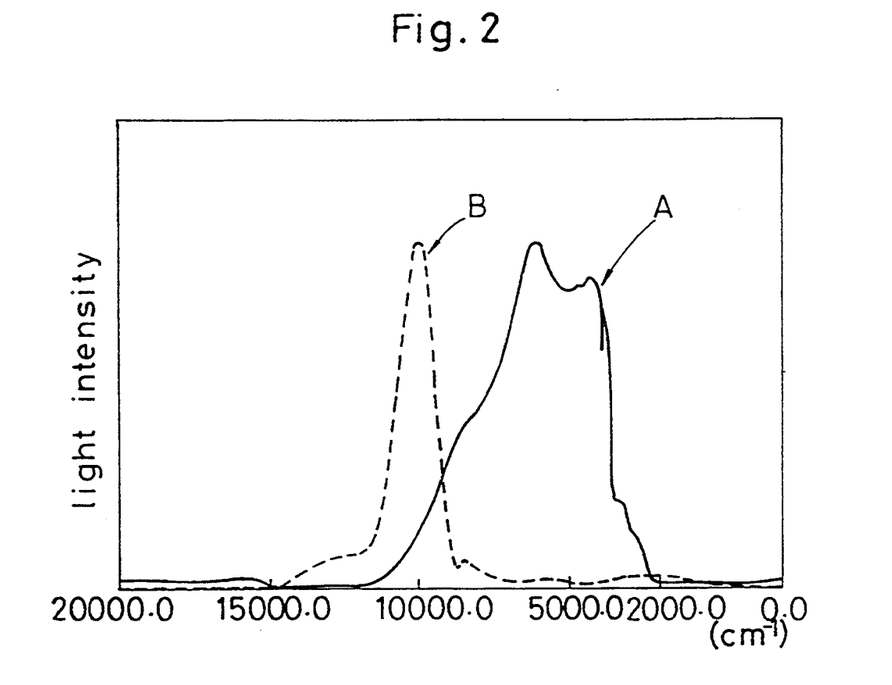
FIG. 2 is a diagram showing sensitivity characteristics of an MCT detector and a Si detector of the complex photodetector in the first embodiment of the present invention.
Figure 3:
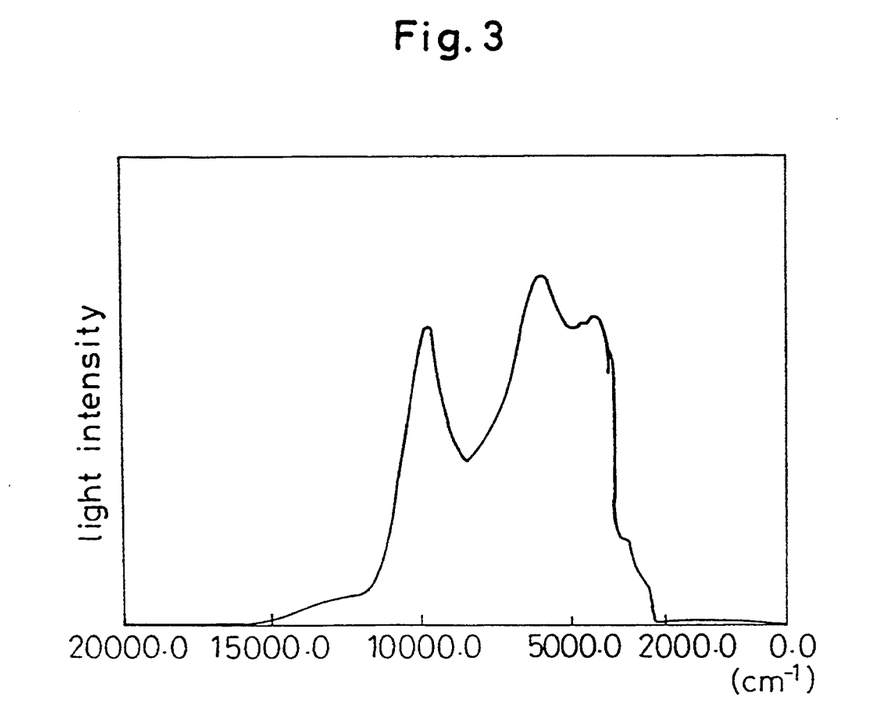
FIG. 3 is a diagram showing a sensitivity characteristic of the complex photodetector in the first embodiment of the present invention.

FIG. 1(b) shows a construction in which the complex photodetector 300 shown in FIG. 1(a) is employed for the FT-IR spectroscope in FIG. 11 in an actual measurement of a semiconductor layer thickness. In the figure, a tungsten halogen lamp is employed as light source 10 and calcium fluoride is employed as material of the beam splitter 14. FIG. 2 shows sensitivity characteristics of the MCT detector and the Si detector respectively as A and B. As shown in FIG. 3, the sensitivity characteristic of the photodetector 300 of complex type incorporating the MCT detector and the Si detector is equal to the sum of the respective sensitivity characteristics of the photodetectors 31 and 32.

Figure 4:
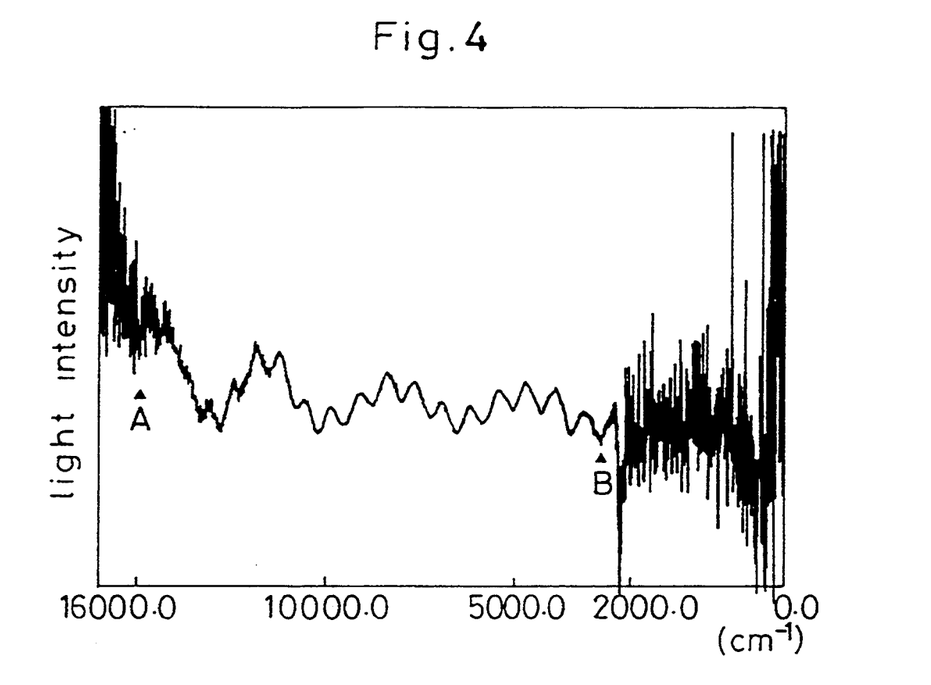
FIG. 4 is a diagram showing a film interference spectrum obtained in measuring laminated film thickness employing the complex photodetector in the first embodiment of the present invention.
Figure 5:
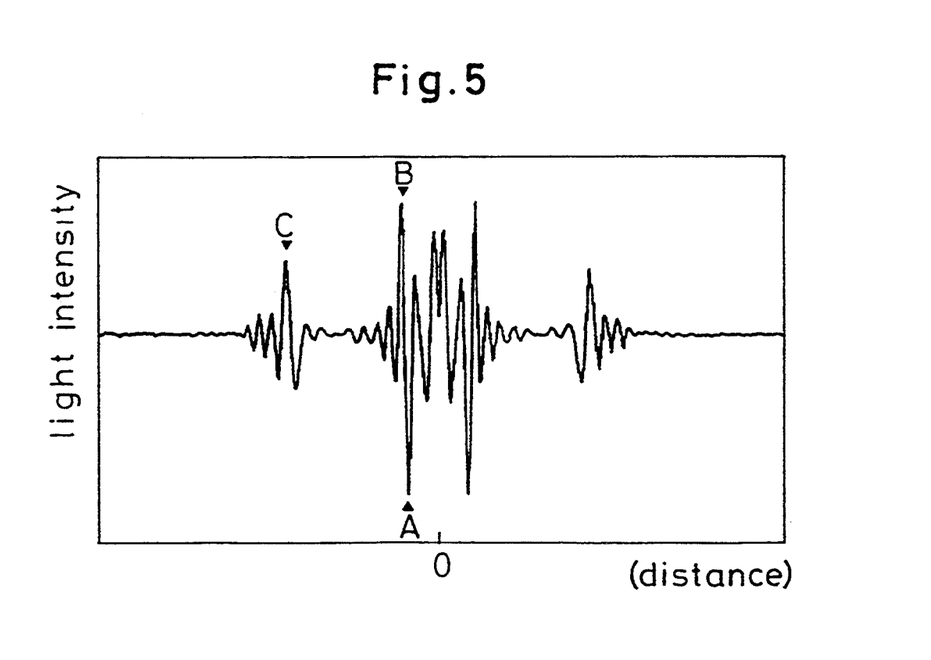
FIG. 5 is a diagram showing a Spatialgram obtained by reverse Fourier-transformation of the film interference spectrum.

FIG. 4 shows a film interference spectrum of the above-described AlGaAs semiconductor three-layer film optically measured by the complex photodetector 300. In the figure, interference light is measured in a photometric wavenumber range $\Delta\nu = 12300$ cm$^{-1}$ from about 15000 cm$^{-1}$ (arrow A) to about 2700 cm$^{-1}$ (arrow B). FIG. 5 shows a Spatialgram obtained by transforming this wavenumber range $\Delta\nu$ by reverse Fourier-transformation. Although from the formula (3), the thin film measurement limit $d_{limit}(12300)$ is 0.12 microns also in this case as described above, thicknesses obtained from the respective side burst peaks A, B and C are respectively 0.42 microns, 0.09 microns and 1.54 microns as shown in FIG. 5, which approximately represent actual thicknesses. This corroborates how effective it is to enlarge the wavenumber range in measuring thin films.

Here, a limit at higher wavenumber side of 15000 cm$^{-1}$ depends on a transmission characteristic of the beam splitter 30 comprising calcium fluoride in FIG. 1(a) and it is possible to carry out an optical measurement of still higher wavenumber by improving this beam splitter. However, the band edge absorption of the $Al_{0.45}Ga_{0.55}As$ crystal of the sample 11 is close to $Eg = 1.99$ eV, namely, 16000 cm$^{-1}$. Even if higher wavenumber photometry is employed, it must be noted that that sample can not provide any significant measurement because of the energy absorption or abnormal dispersion of the refractive index of AlGaAs as the sample. Still, as shown in FIG. 1(c), the MCT detector 31 in FIG. 1(a) can be replaced by a low cost tri-glycine sulfate (TGS) [(NH$_2$CH$_2$COOH)$_3$H$_2$SO$_4$] detector 43 which is generally used for simple photometry. In this case, since parts for the means cooling the MCT detector are not required, the apparatus can be simplified and a production cost can be reduced.

In accordance with this embodiment, the light beam reflected by the sample 11 is received and detected by two photodetectors such as the MCT detector 31 and the Si detector 32 having different wavenumber sensitivity and, therefore, the photometric wavenumber range is enlarged to a range corresponding to the sum of those of the respective photodetectors. A detected signal covering both wavenumber sensitivity ranges can be obtained. Thus, measurement of a semiconductor layer thickness which could not be measured in the prior art optical system is enabled.

A second embodiment of the present invention will be described in detail with reference to FIG. 6.

Figure 6:
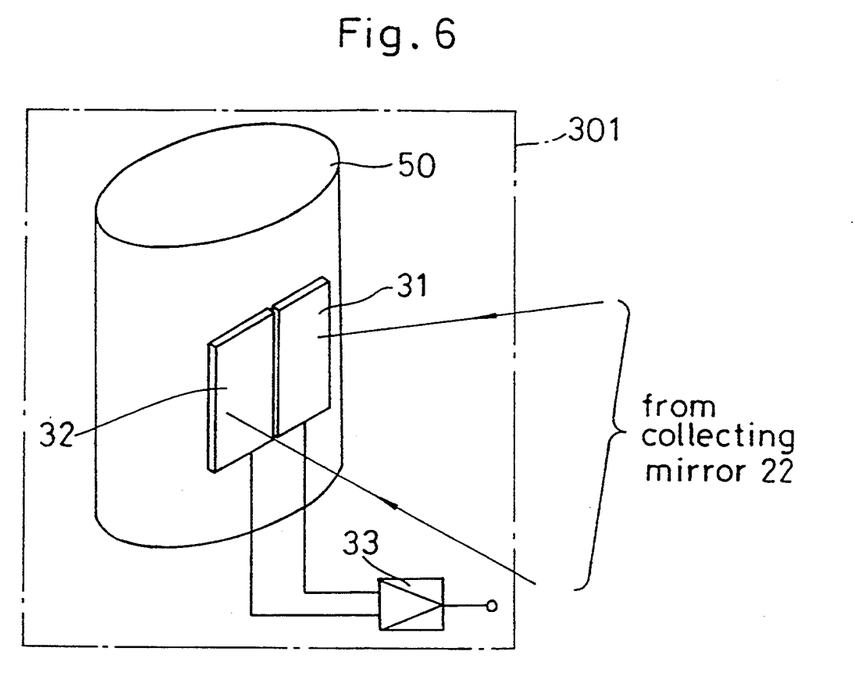
FIG. 6 is a diagram showing a complex photodetector of an apparatus for measuring a semiconductor layer thickness in accordance with a second embodiment of the present invention.

As shown in FIG. 6, in this embodiment the MCT detector 31 and the Si detector 32 are employed as a complex photodetector 301. These detectors are fixed with epoxy resin or in a liquid nitrogen cooler 50 which cools the MCT detector 31 and are arranged on the same plane. A photometric light beam is collected by the collecting mirror 22 in FIG. 1(b) and enters directly into both of the photodetectors 31 and 32, and is detected at the same time. Then, the electric signals output from the detectors are synthesized in the electric signal synthesizer circuit 33. By employing such a construction, influences due to the transmission characteristic of the beam splitter 30 in the photodetector 300 disappear and the photometric wavenumber ranges of both the photodetectors 31 and 32 are obtained more directly, resulting in enhancing the photometry precision.

Figure 7:
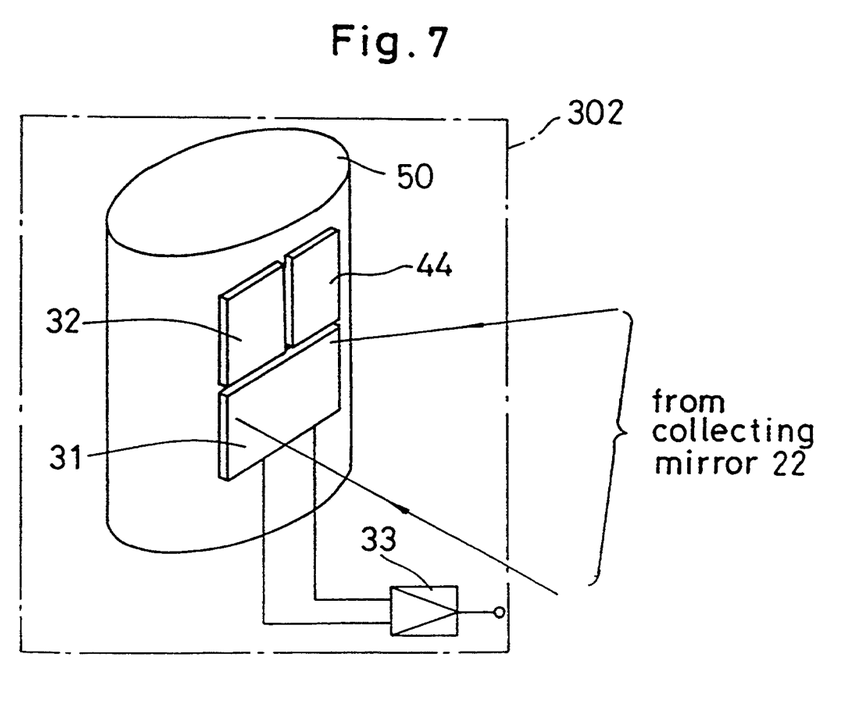
FIG. 7 is a diagram showing a complex photodetector of an apparatus for measuring a semiconductor layer thickness in accordance with a third embodiment of the present invention.

In FIG. 7, a photodetector in accordance with a third embodiment of the present invention, three kinds of photodetectors are employed as a complex photodetector 302. More particularly, while the sensitivity characteristic of the above-described second embodiment is as shown in FIG. 3 having a valley around 9000 cm$^{-1}$ so that the photometric sensitivity in this vicinity has a lower value, this sensitivity valley is interpolated by arranging a germanium (Ge) detector 44 on the same plane as the MCT detector 31 and the Si detector 33, as shown in FIG. 7. In this case, it is desirable to employ an MCT detector having a larger area than other detectors because the MCT detector is inferior in sensitivity to other detectors. By such a construction, a photodetector having a high sensitivity and a wide photometric wavenumber range can be obtained.

Figure 8:
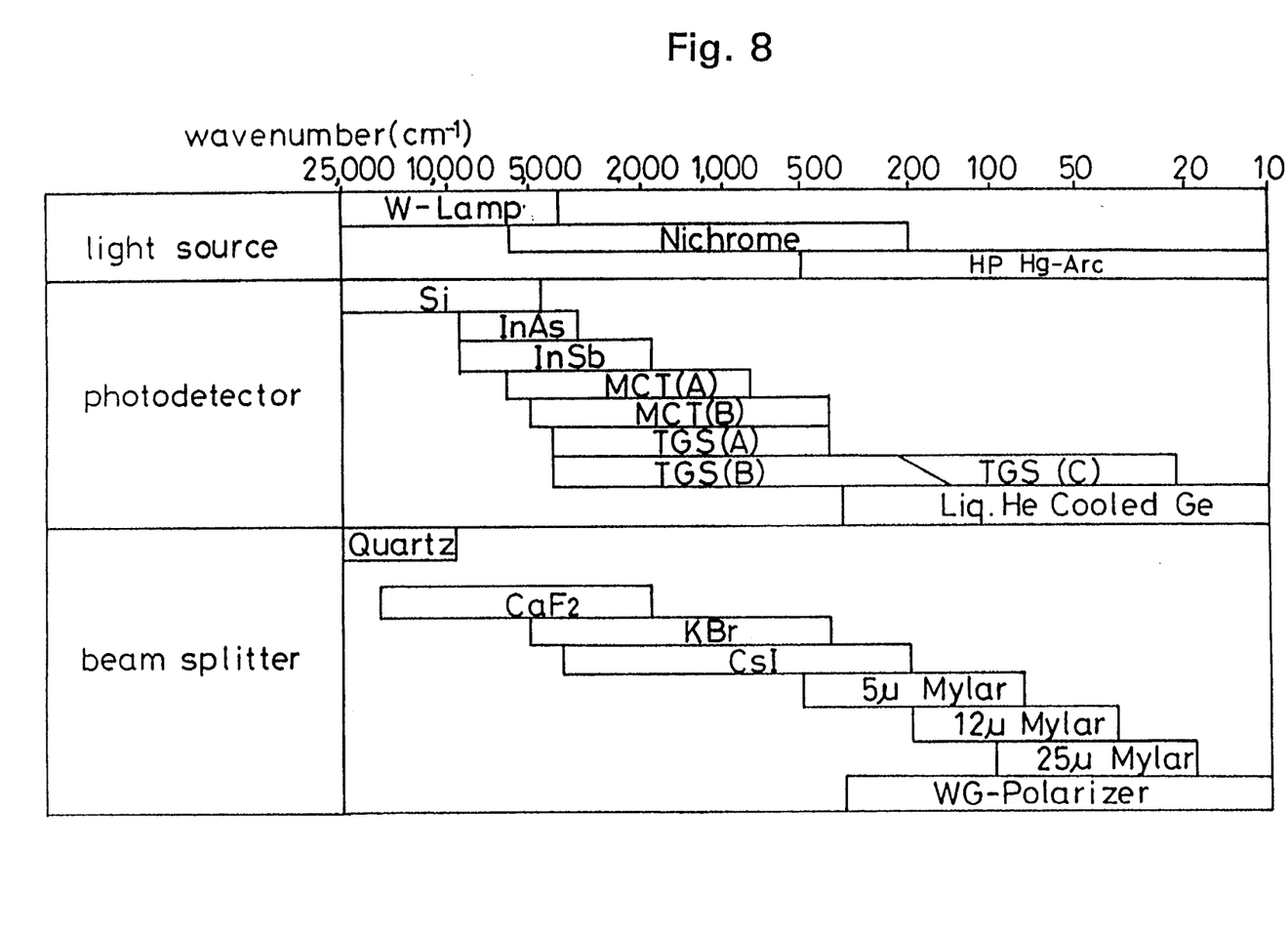
FIG. 8 is a diagram showing a table reciting wavenumber characteristic ranges of various kinds of light sources, photodetectors, and beam splitters.

FIG. 8 shows a chart representing wavenumber characteristic ranges of various kinds of light sources, photodetectors and beam splitters. In the light source row, the wavenumber characteristic ranges of a tungsten lamp, a nichrome lamp, and a high pressure mercury arc lamp, respectively, are presented with some parts thereof overlapping with each other. In the photodetector row, the wavenumber characteristic ranges of the photodetectors respectively comprising silicon, indium arsenic, indium antimonide, MCT, TGS and liquid helium cooled type germanium are presented. In the beam splitter row, the wavenumber characteristic ranges of the beam splitters respectively comprising quartz, calcium fluoride, potassium bromide, cesium iodide, Mylar (polyethyleneterephthalate) [(OCH$_2$CH$_2$OCOC$_6$H$_4$CO)$_n$] of 5 microns, 12 microns and 25 microns thickness, and a wired grid polarizer are presented. In the photodetector row, according to the sum of the wavenumber characteristic ranges of both the MCT detector and the Si detector, the possibility of detection over a wide range from around 25000 cm$^{-1}$ to 500 cm$^{-1}$ is shown. This suggests that light in a range from visible light (blue light) to far infrared ray can be detected by a photodetector of a complex type incorporating an MCT detector and a Si detector for optimization. In FIG. 8, subscripts of A, B or C in parentheses represent a photodetector comprising the same material but with a different composition rate. While two or three kinds of photodetectors are employed in the first to the third embodiments, four or more kinds of photodetectors can be employed.

A fourth embodiment of the present invention will be described in detail with reference to FIGS. 9(a) to 9(c).

Figure 9A:
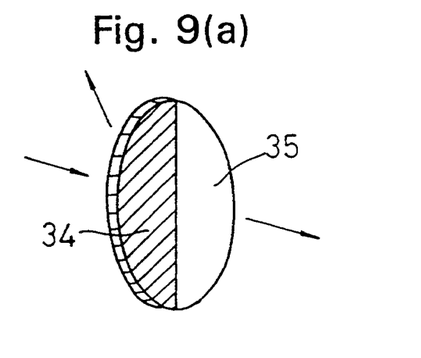
FIGS. 9(a) to 9(c) are schematic diagrams showing a complex beam splitter as a light transmission member of an apparatus for measuring a semiconductor layer thickness in accordance with a fourth embodiment of the present invention.
Figure 9B:
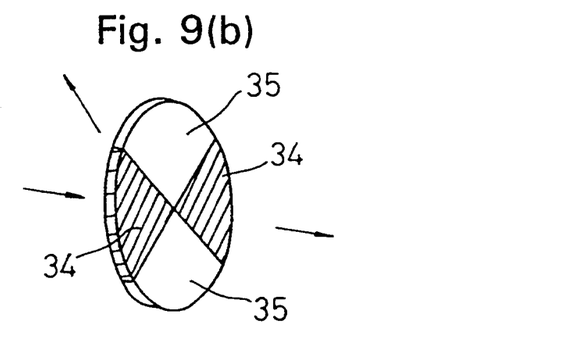
Figure 9C:
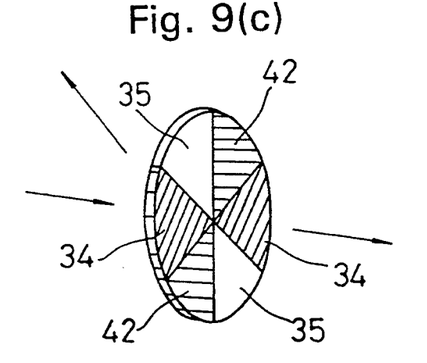

FIGS. 9(a) and 9(b) respectively show light transmission members corresponding to the beam splitter 14 in FIG. 11 according to the fourth embodiment of the present invention. In both constructions of FIGS. 9(a) and 9(b), reference numeral 34 designates a region comprising calcium fluoride ($CaF_2$) and numeral 35 designates a region comprising quartz ($SiO_2$). By employing two materials having different light transmission bands in each half of the light transmission area of the beam splitter, the characteristic wavenumber range thereof as a beam splitter is enlarged to the sum of the respective characteristic wavenumber ranges of the two materials employed singly. In the above-described construction, according to the beam splitter row in the chart of FIG. 8, the whole wavenumber characteristic range of the beam splitter employing calcium fluoride ($CaF_2$) and quartz ($SiO_2$) is approximately from 25000 $cm^{-1}$ to 2000 $cm^{-1}$. In addition, the construction of FIG. 9(b) having more than two different material regions for the plural sectioned areas arranged alternatingly can decrease the destruction of wavefront of transmission light beam to a larger extent than the construction of FIG. 9(a) having two different material regions for the half sectioned areas, thereby providing a more uniform in-plane beam intensity. The beam splitter may comprise three materials as shown in FIG. 9(c). In this construction of FIG. 9(c), a calcium fluoride ($CaF_2$) region 34, a quartz ($SiO_2$) region 35 and a potassium bromide (KBr) region 42 are arranged at the trisected areas of the light transmission region. According to the beam splitter row of FIG. 8, the beam splitter including three materials of calcium fluoride, quartz and potassium bromide makes it possible to conduct optical measurement in the wavenumber range of approximately from 25000 $cm^{-1}$ to 400 $cm^{-1}$, thereby enlarging the long wavelength band to a larger extent than the construction employing two materials as shown in FIGS. 9(a) and 9(b). Further, while the beam splitter comprises three kinds of material in the fourth embodiment, the beam splitter can comprise four or more kinds of material.

A fifth embodiment of the present invention will be described in detail with reference to FIG. 10.

Figure 10:
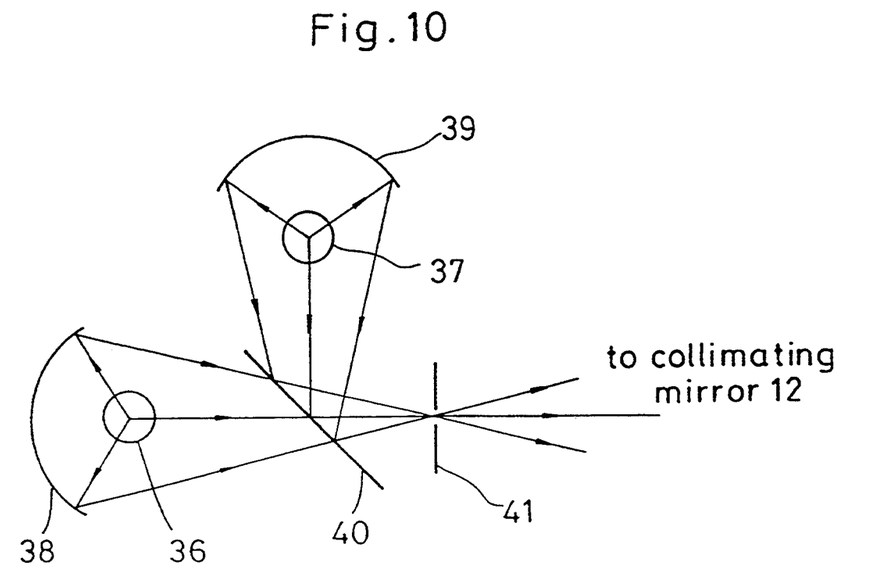
FIG. 10 is a schematic diagram showing a light source of an apparatus for measuring a semiconductor layer thickness in accordance with a fifth embodiment of the present invention.

FIG. 10 shows a light source corresponding to light source 10 in FIG. 11. In FIG. 10, light beams from a tungsten halogen lamp 36 and a nichrome luminous lamp 37 are collected by collecting mirrors 38 and 39 respectively and they are synthesized through a beam splitter 40. Then, the synthesized beam is reformed by an aperture 41 so as to be a collected light source and it is introduced into the collimating mirror 12 of FIG. 11. Since the optical path lengths from the aperture 41 to the respective lamps 36 and 37 are equal, the respective light beams from the lamps which are synthesized at the beam splitter 40 have the same wavefronts at the aperture 41 and become the same parallel light beam at the collimating mirror 12. Thus, by combining the tungsten halogen lamp 36 and the nichrome luminous lamp 37 and synthesizing the outgoing light therefrom, it is possible to irradiate with a light beam of the wavenumber range from 25000 $cm^{-1}$ to 200 $cm^{-1}$ as shown in the light sources row of FIG. 8. Further, while two kinds of light sources are employed in the fifth embodiment, three or more kinds of light sources can be employed.

In addition, while the beam splitter 14 in the Michelson interferometer 13 (FIG. 1(b)) is employed for illustrating the fourth embodiment, for other beam splitters in an optical path from the light source 10 to the photodetector 23, such as the beam splitter 30 in FIG. 1(a) and the beam splitter 40 in FIG. 10, the construction of the fourth embodiment can be employed.

As described above, in an apparatus for measuring a semiconductor layer thickness according to the present invention, a photodetector, a light transmitting material, and a light source are optically combined so that parts of respective wavenumber characteristic ranges over-lap with each other. Thereby, a wavenumber range of the sum of the wavenumber ranges of the respective components is obtained, enabling Fourier-transformation spectroscopy over a wavenumber range as wide as possible in conducting an optical measurement, thereby enhancing greatly the thin film measurement limit in semiconductor layer thickness measurements employing film interference spectrum analysis.

What is claimed is:

1. An apparatus for measuring the thickness of a semiconductor layer comprising:
a light source emitting light;
an interferometer producing modulated interference light by modulating light from said light source;
an optical system including a light transmission member for introducing the modulated interference light into a measurement sample comprising at least one film on a substrate; and
light detecting means for detecting modulated interference light reflected from the film and producing an output signal in response wherein said light detecting means comprises a plurality of photodetectors having respective, different photometric spectral response ranges, the photometric spectral response range of each photodetector partially overlapping the photometric spectral response range of another photodetector.

2. The apparatus of claim 1 wherein said plurality of photodetectors are arranged in the same plane.

3. The apparatus of claim 2 wherein said plurality of photodetectors includes a mercury cadmium telluride photodetector, a silicon photodetector, and a germanium photodetector.

4. The apparatus of claim 1 wherein said plurality of photodetectors includes a mercury cadmium telluride photodetector and a silicon photodetector.

5. An apparatus for measuring the thickness of a semiconductor layer comprising:
a light source emitting light;
an interferometer producing modulated interference light by modulating light from said light source;
an optical system including a light transmission member for introducing the modulated interference light into a measurement sample comprising at least one film on a substrate; and
light detecting means for detecting modulated interference light reflected from the film and producing an output signal in response wherein said light transmission member of said optical system comprises a plurality of materials having respective, different spectral transmission ranges partially overlapping each other.

6. The apparatus of claim 5 wherein said plurality of materials include calcium fluoride and quartz.

7. The apparatus of claim 5 wherein said plurality of materials includes calcium fluoride, quartz, and potassium bromide.

8. An apparatus for measuring the thickness of a semiconductor layer comprising:
light source means for emitting measurement light;

an interferometer producing modulated interference light by modulating light from said light source means;

an optical system including a light transmission member for introducing the modulated interference light into a measurement sample comprising at least one film on a substrate; and light detecting means for detecting modulated interference light reflected from the film and producing an output signal in response wherein said light source means comprises a plurality of light sources respectively emitting light over different wavelength ranges, the different wavelength ranges partially overlapping each other, light from said light sources being optically combined as the measurement light.

9. The apparatus of claim 8 wherein said plurality of light sources includes a tungsten halogen lamp and a nichrome lamp.

10. An apparatus for measuring the thickness of a semiconductor layer comprising:

a light source emitting light;

an interferometer producing modulated interference light by modulating light from said light source;

an optical system including a light transmission member for introducing the modulated interference light into a measurement sample comprising at least one film on a substrate; and light detecting means for detecting modulated interference light reflected from the film and producing an output signal in response wherein said light source, said light transmission member, and said light detecting means each respectively comprises a plurality of members having respective spectral characteristic ranges, the spectral characteristic ranges of said light source, optical system, and light detecting means respectively partially overlapping each other.

* * * * *